US012782734B2

(12) United States Patent
Yonetani et al.

(10) Patent No.: US 12,782,734 B2
(45) Date of Patent: Nov. 3, 2026

(54) HEAD-UP DISPLAY DEVICE

(71) Applicant: Panasonic Automotive Systems Co., Ltd., Kanagawa (JP)

(72) Inventors: Yusuke Yonetani, Hyogo (JP); Yuji Takase, Osaka (JP); Takato Hada, Osaka (JP); Kota Mochinaga, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 263 days.

(21) Appl. No.: 18/594,714

(22) Filed: Mar. 4, 2024

(65) Prior Publication Data

US 2024/0310632 A1 Sep. 19, 2024

(30) Foreign Application Priority Data

Mar. 13, 2023 (JP) ................................ 2023-038883

(51) Int. Cl.
*G02B 27/01* (2006.01)

(52) U.S. Cl.
CPC ................................ *G02B 27/0172* (2013.01)

(58) Field of Classification Search
CPC ................................................. G02B 20/0172
USPC ......................................................... 359/630
See application file for complete search history.

(56) References Cited

U.S. PATENT DOCUMENTS

| | | | | |
|---|---|---|---|---|
| 2017/0329134 | A1* | 11/2017 | Onda ..................... | B60K 35/23 |
| 2018/0129042 | A1 | 5/2018 | Yamazoe et al. | |
| 2018/0370362 | A1 | 12/2018 | Watanabe | |
| 2019/0121128 | A1 | 4/2019 | Kasahara et al. | |

(Continued)

FOREIGN PATENT DOCUMENTS

| | | | |
|---|---|---|---|
| CN | 108132532 | A | 6/2018 |
| JP | 2009-075514 | A | 4/2009 |
| JP | 2017-187528 | A | 10/2017 |

(Continued)

OTHER PUBLICATIONS

Office Action issued in the corresponding Japanese patent application No. 2023-038883 mailed on Jun. 30, 2026, along with an English translation thereof.

(Continued)

*Primary Examiner* — Bumsuk Won
*Assistant Examiner* — Mitchell T Oestreich
(74) *Attorney, Agent, or Firm* — Greenblum & Bernstein, P.L.C.

(57) ABSTRACT

A head-up display device includes: a housing including an opening at a top; a cover closing the opening; a display element housed in the housing; a first optical element on an optical path of display light from the display element; and a second optical element disposed on a portion of the optical path of the display light after the first optical element, and reflecting the display light toward the opening. The cover has a downward convex shape and includes a curved surface portion descending from a front end portion toward a rear end portion of the cover. The first optical element converges the display light. Among the display light emitted from a first end portion of the display element closer to the first optical element, light incident on an upper end portion of the first optical element travels toward a point below an upper edge of the second optical element.

6 Claims, 8 Drawing Sheets

(56) References Cited

U.S. PATENT DOCUMENTS

| | | | |
|---|---|---|---|
| 2019/0212553 | A1 | 7/2019 | Kaneko et al. |
| 2019/0212554 | A1 | 7/2019 | Kikuchi et al. |

FOREIGN PATENT DOCUMENTS

| | | | |
|---|---|---|---|
| JP | 2019-008203 | A | 1/2019 |
| JP | 2019-098923 | | 6/2019 |
| JP | 6558017 | | 8/2019 |
| JP | 6569510 | | 9/2019 |
| JP | 6823817 | | 2/2021 |
| JP | 6963732 | | 11/2021 |
| WO | 2018/056111 | A | 3/2018 |
| WO | 2020/250896 | | 12/2020 |

OTHER PUBLICATIONS

Office Action issued in the corresponding Japanese patent application No. 2023-038883 mailed on Apr. 14, 2026, along with an English translation thereof.

* cited by examiner

HEAD-UP DISPLAY DEVICE

CROSS REFERENCE TO RELATED APPLICATION

The present application is based on and claims priority of Japanese Patent Application No. 2023-038883 filed on Mar. 13, 2023.

FIELD

The present disclosure relates to a head-up display device.

BACKGROUND

Patent Literature (PTL) 1 discloses a head-up display device that includes: a display unit that emits display light; a case that houses the display unit and has an opening that transmits the display light to the outside of the case to project the display light onto a projection part located outside the case; and an opening cover that closes the opening. In such a head-up display device, the opening cover is curved inward along a parabola toward one of two ends of the opening cover, which is an incident side of the display light, and the two ends are spaced apart by the opening.

CITATION LIST

Patent Literature

[PTL 1] Japanese Unexamined Patent Application Publication No. 2019-98923

SUMMARY

However, the head-up display according to PTL 1 can be improved upon.

In view of this, the present disclosure provides a head-up display device capable of improving upon the above related art.

A head-up display device according to one aspect of the present disclosure includes: a housing including an opening at a top; a cover that is light-transmissive and closes the opening; a display element housed in the housing; a first optical element disposed on an optical path of display light emitted from the display element; and a second optical element that is disposed ahead of the first optical element on a portion of the optical path of the display light after the first optical element, and reflects the display light toward the opening. The cover has a downward convex shape and includes a curved surface portion that descends in a direction from a front end portion of the cover toward a rear end portion of the cover, the first optical element has an effect of converging the display light, and among display light emitted from one end portion, among end portions of the display element, that is closer in distance to the first optical element, light incident on an upper end portion of the first optical element travels toward a point below an upper edge of the second optical element.

A head-up display device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
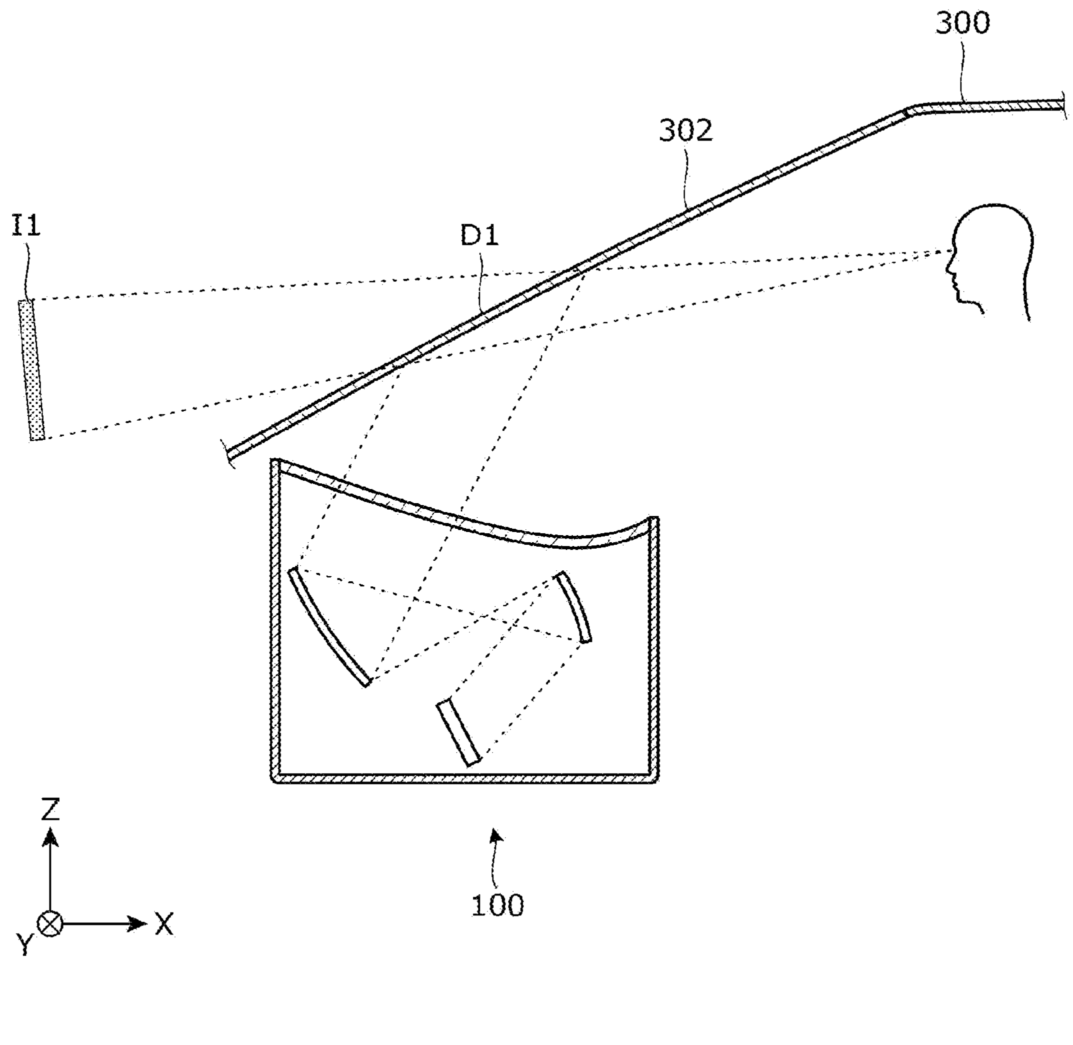
FIG. 1 is a diagram illustrating a use example of a head-up display device according to an embodiment.

Underlying Knowledge Forming Basis of the Present Disclosure

The present inventors have found that the following problems arise with regard to the head-up display device described in the "Background" section. For example, in the head-up display device described above, stray light may occur due to the opening cover. This can be noticeable in a head-up display device whose height has been lowered. In other words, the present disclosure aims to provide a head-up display device capable of inhibiting generation of stray light.

A head-up display device according to one aspect of the present disclosure includes: a housing including an opening at a top; a cover that is light-transmissive and closes the opening; a display element housed in the housing; a first optical element disposed on an optical path of display light emitted from the display element; and a second optical element that is disposed ahead of the first optical element on a portion of the optical path of the display light after the first optical element, and reflects the display light toward the opening. The cover has a downward convex shape and includes a curved surface portion that descends in a direction from a front end portion of the cover toward a rear end portion of the cover, the first optical element has an effect of converging the display light, and among display light emitted from one end portion, among end portions of the display element, that is closer in distance to the first optical element, light incident on an upper end portion of the first optical element travels toward a point below an upper edge of the second optical element.

Here, among display light emitted from one end portion, among end portions of the display element, that is closer in distance to the first optical element, light incident on the upper end portion of the first optical element is likely to deviate from the second optical element and be reflected off the cover, and become stray light. For this reason, in the present aspect, since the cover has a downward convex shape that descends in a direction from the front end portion toward the rear end portion, the front end portion of the cover can be located away from the light incident on the upper end portion of the first optical element. When the cover has such a shape, the display light incident on the first optical element may be reflected off the cover. However, since the first optical element has an effect of converging the display light, the convergence can cause the display light to avoid the cover. In addition, the display element, the first optical element, and the second optical element are disposed such that the light incident on the upper end portion of the first optical element travels toward a point below the upper edge of the second optical element. Therefore, it is difficult for the light incident on the upper end portion of the first optical element to deviate from the second optical element. Based on these factors, the occurrence of stray light caused by the light incident on the upper end portion of the first optical element can be inhibited.

Moreover, $D>|fv|$ may be satisfied, where D is a distance from a center of the display element to a center of the first optical element, and fv is a focal length of the first optical element.

With this, distance D and focal length fv of the first optical element satisfy the above relationship, and therefore the converged display light rays of the first optical element can intersect reliably.

Moreover, among the display light emitted from the one end portion of the display element, light incident on a lower end portion of the first optical element may travel with an upward vector to the second optical element.

With this, the space consumed by the display light can be reduced because the light incident on the lower end portion of the first optical element travels with an upward vector to the second optical element. The display element can be disposed in this reduced space, and therefore the height of the head-up display can be reduced.

Moreover, the rear end portion of the cover may be located below the front end portion of the cover.

Since the rear end portion of the cover is located below the front end portion of the cover, the height of the head-up display device can be reduced at its rear.

Moreover, the first optical element may be a concave mirror.

With this, even with a head-up display device including a concave mirror as the first optical element, the height of the head-up display device can be reduced.

Moreover, the first optical element may be a convex lens.

With this, even with a head-up display device including a convex lens as the first optical element, the height of the head-up display device can be reduced.

Moreover, at least part of the display element may be located above a lower edge of the second optical element.

With this, the at least part of the display element and the lower edge of the second optical element overlap each other, thereby reducing the height of head-up display device.

Embodiment

The following specifically describes an embodiment with reference to the drawings. Note that the embodiment described below shows a specific example of the present disclosure. The numerical values, shapes, materials, structural elements, the arrangement and connection of the structural elements, steps, the order of the steps, etc. mentioned in the following embodiment are mere examples and not intended to limit the present disclosure. Among the structural elements in the following embodiments, structural elements not recited in any one of the independent claims representing broadest concepts are described as optional structural elements.

In the present embodiment, the vertical direction is defined as a Z-axis direction, a direction perpendicular to the Z-axis direction, which is a direction in which a vehicle travels, is defined as an X-axis direction, and a direction perpendicular to the Z-axis direction and the X-axis direction (left and right direction of the vehicle) is defined as a Y-axis direction. The Z-axis negative direction is defined as downward, below, or lower and the Z-axis positive direction is defined as upward, above, upper, or top. The X-axis negative direction is defined as a direction in which the vehicle travels (front, forward, or ahead) and the X-axis positive direction defined as rear or behind. The Y-axis negative direction is to the left when the vehicle is facing forward, and the Y-axis positive direction is to the right when the vehicle is facing forward. As described above, the present disclosure defines each direction based on the orientation of the vehicle when the head-up display device is provided in the vehicle.

1. Use Example of Head-Up Display Device

Figure 2:
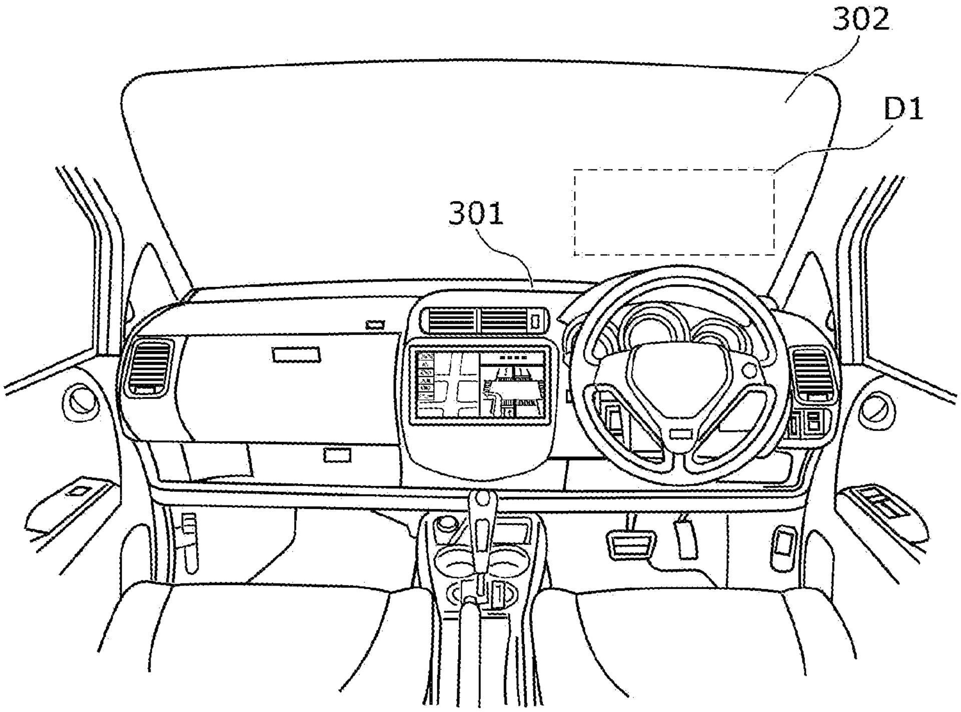
FIG. 2 is a diagram illustrating a display area of an image displayed by the head-up display device according to the embodiment.

First, a use example and a schematic configuration of head-up display device 100 according to the present embodiment will be described with reference to FIG. 1 and FIG. 2. FIG. 1 is a diagram illustrating a use example of head-up display device 100 according to the embodiment. FIG. 2 is a diagram illustrating a display area of an image displayed by head-up display device 100 according to the embodiment.

Head-up display device 100 according to the present embodiment is configured as an in-vehicle head-up display (HUD) and is provided near the upper surface of dashboard 301 of vehicle 300.

Head-up display device 100 projects light onto area D1 of windshield 302, which is a display medium. The projected light is reflected off windshield 302. This reflected light travels toward the eyes of the driver sitting in the driver's seat, who is a user of head-up display device 100. The driver captures the reflected light entered the eyes as virtual image I1, seen on the other side of windshield 302 (outside the vehicle), against the background of what is actually visible through windshield 302. In the present embodiment, this series of situations is expressed as, for example, "head-up display device 100 displays virtual image I1 using windshield 302".

FIG. 2 is a diagram illustrating an example of D1, which is an area onto which light is projected by head-up display device 100 according to the present embodiment.

As illustrated in FIG. 2, head-up display device 100 provided in dashboard 301 projects light, for example, onto area D1 (the area enclosed by a dashed line in the figure) of windshield 302, which is located downward toward the driver's seat. With this, virtual image I1 (see FIG. 1) visible to the driver sitting in the driver's seat is shown, appearing on the opposite side of windshield 302 (outside the vehicle).

2. Configuration of Head-Up Display Device

Figure 3:
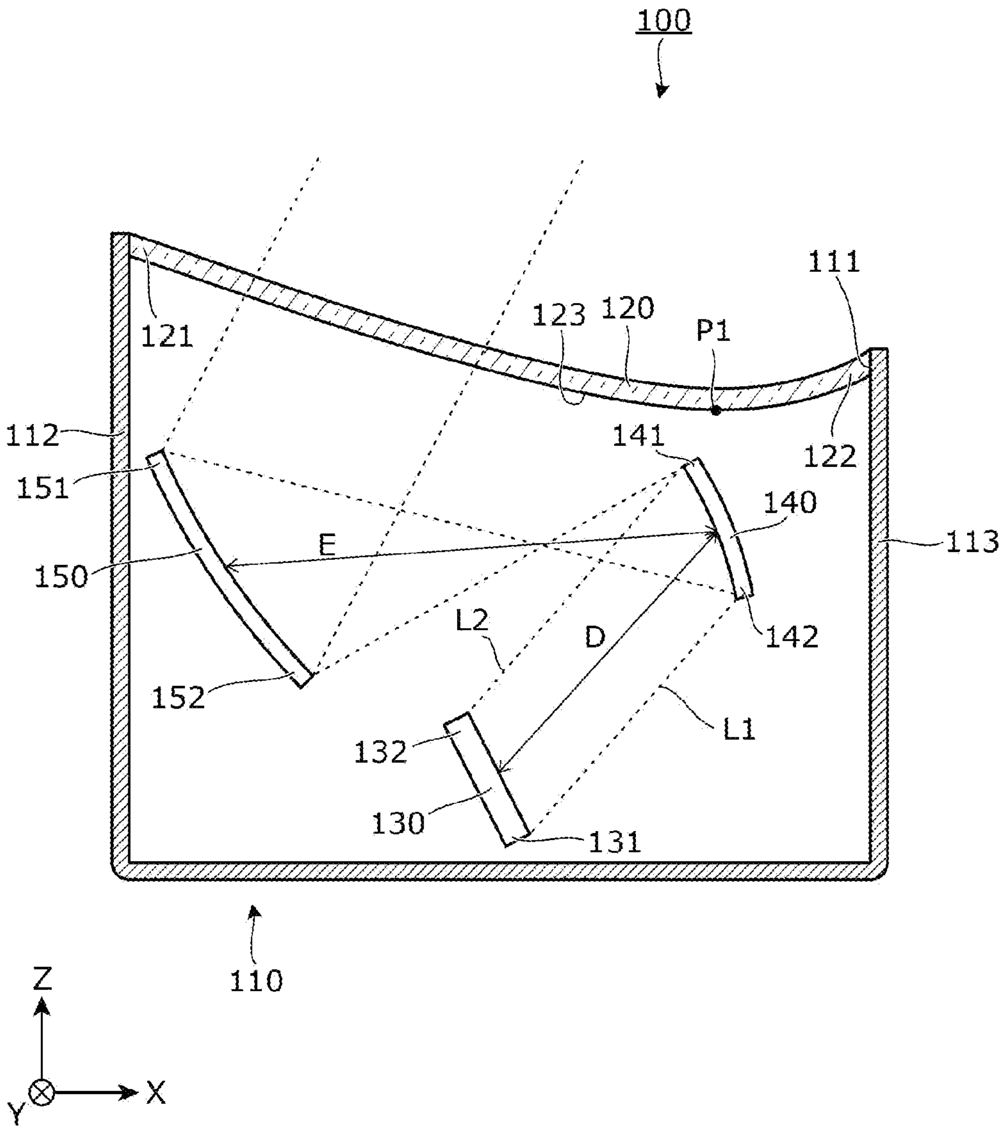
FIG. 3 is a schematic cross-sectional view of the head-up display device according to the embodiment.

Next, a configuration of head-up display device 100 will be described with reference to FIG. 3. FIG. 3 is a schematic cross-sectional view of head-up display device 100 according to the embodiment.

As illustrated in FIG. 3, head-up display device 100 includes housing 110, cover 120, display element 130, first optical element 140, and second optical element 150.

Housing 110 has a box-shaped body including light-shielding resin or metal. More specifically, housing 110 has a substantially rectangular parallelepiped shape that is elongated in the Y-axis direction, and includes opening 111 at the top. In housing 110, the upper edge of front wall 112 is located higher than the upper edge of rear wall 113, and opening 111 is provided between the upper edge of front wall 112 and the upper edge of rear wall 113. Opening 111 is closed by cover 120. The interior space of housing 110 and cover 120 houses display element 130, first optical element 140, and second optical element 150.

Cover 120 is a curved plate body including, for example, light-transmissive resin or glass. More specifically, cover 120 includes front end portion 121 joined to the upper edge of front wall 112, and rear end portion 122 joined to the upper edge of rear wall 113. Cover 120 has a downward convex shape as a whole. Cover 120 has curved surface portion 123 that descends in the direction (X-axis positive direction) from front end portion 121 toward rear end portion 122 of cover 120. Rear end portion 122 of cover 120 is located below front end portion 121. Here, lowest point P1 of cover 120 is located at a position in the X-axis positive direction relative to the center of cover 120 in the X-axis direction.

Display element 130 is, for example, a liquid crystal panel. When display element 130 is illuminated with light from a light source, which is not illustrated, display light that produces a virtual image is emitted to first optical element 140. Display element 130 may be an organic electroluminescent (EL) panel. Display element 130 has a rectangular shape in a plan view and is disposed in an orientation that is tilted relative to the horizontal plane (XY plane). More specifically, display element 130 is disposed in an orientation in which each long side extends in the Y-axis direction and one long side is above the other long side. In the present embodiment, the rear long side of display element 130 is located below the front long side of display element 130. Hereinafter, an end portion that includes the rear long side of display element 130 may be referred to as first end portion 131, and an end portion that includes the front long side of display element 130 may be referred to as second end portion 132. First end portion 131 is an example of one end portion that is closer in distance to first optical element 140 than second end portion 132 is. The display surface of display element 130 that emits the display light is located opposite to first optical element 140.

First optical element 140 is disposed on a portion of the optical path of the display light emitted from display element 130, and is an optical member that has an effect of converging the display light. More specifically, first optical element 140 is a concave mirror having a rectangular shape in a plan view. First optical element 140 is disposed in an orientation that is tilted relative to the vertical plane (YZ plane). More specifically, first optical element 140 is disposed in an orientation in which each long side extends in the Y-axis direction and one long side is above the other long side. In the present embodiment, the upper long side of first optical element 140 is located ahead of the lower long side. Hereinafter, an end portion that includes the upper long side of first optical element 140 may be referred to as upper end portion 141, and an end portion that includes the lower long side of first optical element 140 may be referred to as lower end portion 142. The reflective surface of first optical element 140 is located opposite to display element 130 and second optical element 150. In other words, the reflective surface of first optical element 140, which is a mirror surface of the concave mirror, faces inward of housing 110, and the convex surface of first optical element 140 faces outward of housing 110.

Here, as illustrated in FIG. 3, display element 130 and first optical element 140 are disposed to satisfy $D>|fv|$, where D is a distance from the center of display element 130 to the center of first optical element 140, and fv is a focal length of first optical element 140. Moreover, as viewed in the Y-axis direction, first optical element 140 and second optical element 150 are disposed to satisfy $E>|fv|$, where E is a distance from the center of first optical element 140 to the center of second optical element 150, and fv is a focal length of first optical element 140.

Second optical element 150 is disposed on a portion the optical path of the display light after first optical element 140. Second optical element 150 is an optical member that reflects the display light reflected off first optical element 140 toward opening 111. More specifically, second optical element 150 is a concave mirror having a rectangular shape in a plan view. Second optical element 150 is disposed ahead of first optical element 140 in an orientation that is tilted relative to the vertical plane (YZ plane). More specifically, second optical element 150 is disposed in an orientation in which each long side extends in the Y-axis direction and one long side is above the other long side. In the present embodiment, the upper long side of second optical element 150 is located ahead of the lower long side. Hereinafter, an end portion that includes the upper long side of second optical element 150 may be referred to as upper end portion 151, and an end portion that includes the lower long side of second optical element 150 may be referred to as lower end portion 152. The reflective surface of second optical element 150 is located opposite to second optical element 150 and cover 120. In other words, the reflective surface of second optical element 150, which is a mirror surface of the concave mirror, faces inward of housing 110, and the convex surface of second optical element 150 faces outward of housing 110.

3. Function of Head-Up Display Device

Next, the optical path of the display light emitted from display element 130 will be described. As illustrated in FIG. 3, light L1, which is most of light emitted from first end portion 131 among end portions of display element 130, is incident on and reflected off lower end portion 142 of first optical element 140. In other words, light L1 is light incident on lower end portion 142 of first optical element 140. Light L1 is reflected off lower end portion 142 and travels with an upward vector to upper end portion 151 of second optical element 150. This is due to the convergence effect of first optical element 140. Light L1 is then reflected off upper end portion 151 of second optical element 150, passes through cover 120, and travels to windshield 302.

On the other hand, light L2, which is most of light emitted from second end portion 132 among end portions of display element 130, is incident on and reflected off upper end portion 141 of first optical element 140. Light L2 is reflected off upper end portion 141 and travels with a downward vector to lower end portion 152 of second optical element 150. This is due to the convergence effect of first optical element 140. In other words, light L1 and light L2 intersect between first optical element 140 and second optical element 150. Light L2 is then reflected off lower end portion 152 of second optical element 150, passes through cover 120, and travels to windshield 302.

Light that may become stray light is also emitted from first end portion 131 and second end portion 132 of display element 130. Since light L3, which is part of light emitted from first end portion 131 of display element 130, is likely to be stray light, light L3 is used here as an example and its optical path will be described.

Figure 4:
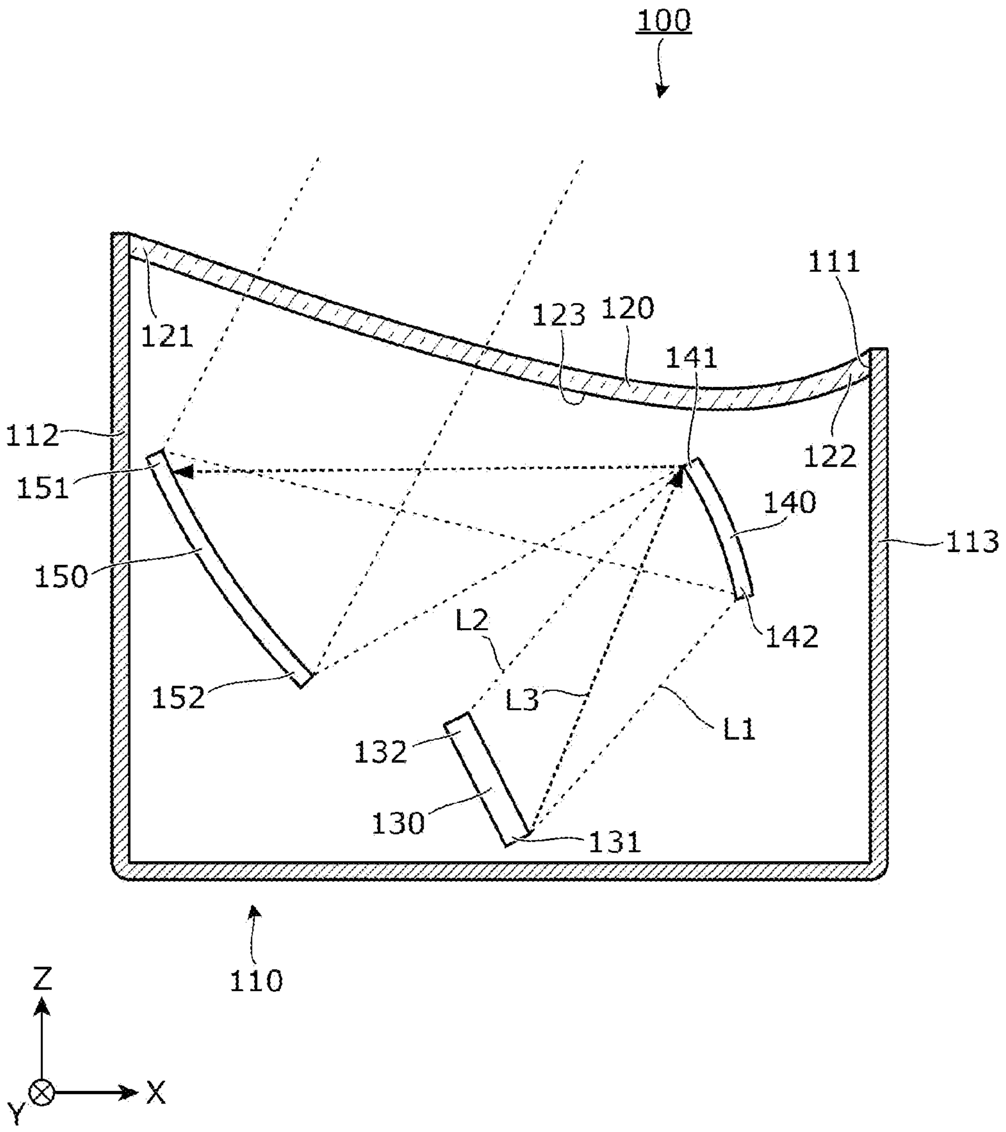
FIG. 4 is an explanatory diagram illustrating an optical path of part of the light emitted from a first end portion of a display element according to the embodiment.

FIG. 4 is an explanatory diagram illustrating an optical path of light L3, which is part of the light emitted from first end portion 131 of display element 130 according to the embodiment. FIG. 4 corresponds to FIG. 3. As illustrated in FIG. 4, light L3, which is part of light emitted from first end portion 131 of display element 130, travels to upper end portion 141 of first optical element 140, and is incident on and reflected off upper end portion 141. In other words, light L3 is light that is incident on upper end portion 141 of first optical element 140. Light L3 then travels toward a point below the upper edge of second optical element 150 due to the convergence effect of first optical element 140. As a result, light L3 avoids cover 120 and travels to second optical element 150. That is, light L3 is not reflected off cover 120 before reaching second optical element 150.

Figure 5:
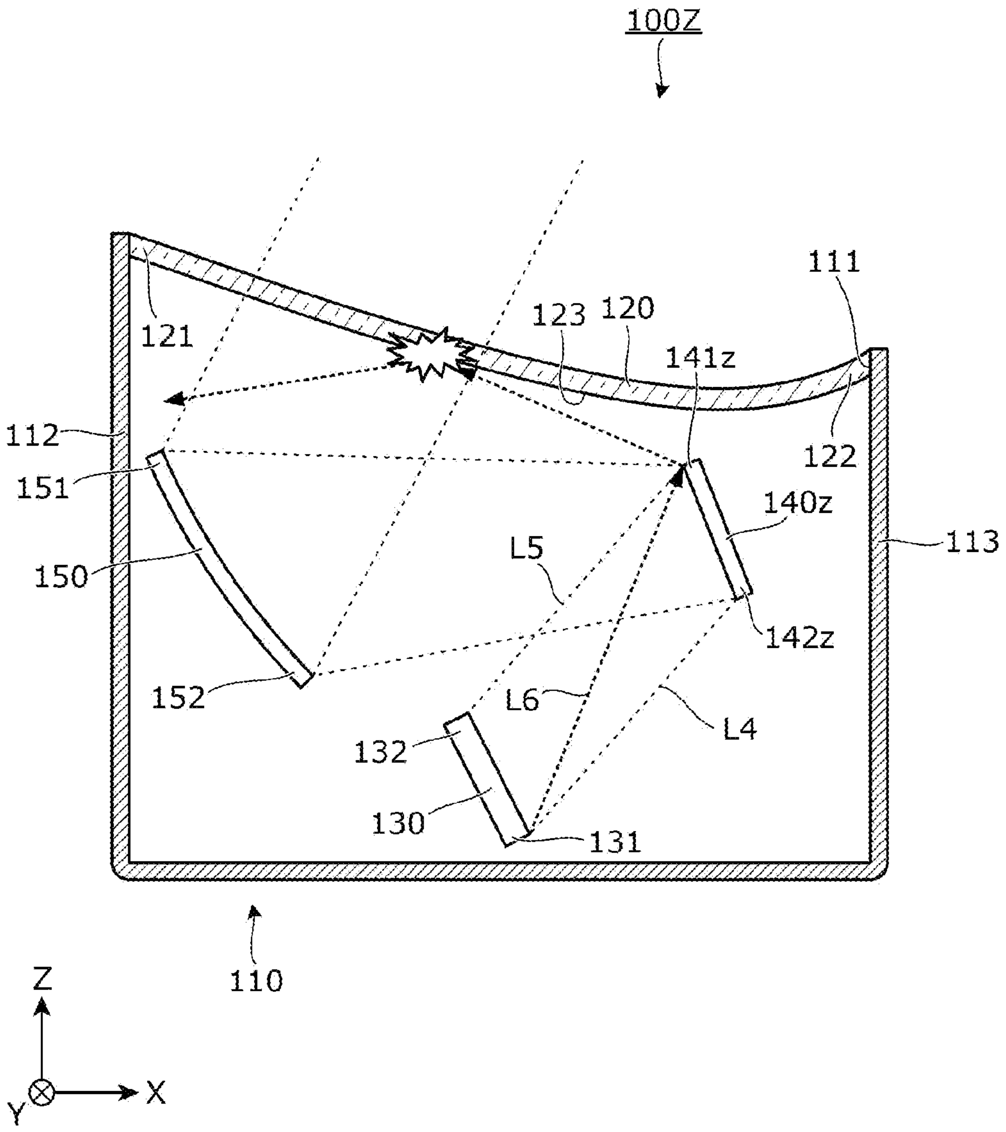
FIG. 5 is a schematic cross-sectional view of a head-up display device according to a comparative example.

Next, as a comparative example, a case where first optical element 140*z*, which does not have a converging effect, is used will be described. FIG. 5 is a schematic cross-sectional view of head-up display device 100Z according to the comparative example. In the comparative example, head-up display device 100Z is the same as head-up display device 100 according to the embodiment, except that first optical element 140*z* is a plane mirror.

As illustrated in FIG. 5, light L4, which is most of light emitted from first end portion 131 among end portions of display element 130, is reflected off lower end portion 142*z* of first optical element 140*z* and travels to lower end portion 152 of second optical element 150. Light L4 is then reflected off lower end portion 152 of second optical element 150, passes through cover 120, and travels to windshield 302.

In contrast, light L5, which is most of light emitted from second end portion 132 among end portions of display element 130, is reflected off upper end portion 141*z* of first optical element 140*z* and travels to upper end portion 151 of second optical element 150. Light L5 is then reflected off upper end portion 151 of second optical element 150, passes through cover 120, and travels to windshield 302.

Here, light L6, which is part of light emitted from first end portion 131 of display element 130, travels to upper end portion 141*z* of first optical element 140 and is reflected off upper end portion 141*z*. Since first optical element 140 is a plane mirror, light L6 is reflected toward cover 120. This reflection causes stray light. As described above, stray light occurs in the comparative example, but it can be seen that occurrence of stray light is inhibited in head-up display device 100 according to the present embodiment.

4. Advantageous Effects, Etc.

As described above, head-up display device 100 according to the embodiment includes: housing 110 including opening 111 at a top; cover 120 that is light-transmissive and closes opening 111; display element 130 housed in housing 110; first optical element 140 disposed on an optical path of display light emitted from display element 130; and second optical element 150 that is disposed ahead of first optical element 140 on a portion of the optical path of the display light after first optical element 140, and reflects the display light toward opening 111. Cover 120 has a downward convex shape and includes curved surface portion 123 that descends in a direction from front end portion 121 of cover 120 toward rear end portion 122 of cover 120. First optical element 140 has an effect of converging the display light. Among display light emitted from first end portion 131, among end portions of display element 130, that is closer in distance to first optical element 140, light L3 incident on upper end portion 141 of first optical element 140 travels toward a point below an upper edge of second optical element 150.

As described above, cover 120 has a downward convex shape and includes curved surface portion 123 that descends in a direction from front end portion 121 toward rear end portion 122, front end portion 121 of cover 120 can be disposed away from the light (light L3) incident on upper end portion 141 of first optical element 140. When cover 120 has such a shape, the display light incident on first optical element 140 may be reflected off cover 120. However, since first optical element 140 has the effect of converging the display light, it is possible to cause light L3, which is part of the display light, to avoid cover 120 by convergence. In addition, display element 130, first optical element 140, and second optical element 150 are disposed such that the light (light L3) incident on upper end portion 141 of first optical element 140 travels toward a point below the upper edge of second optical element 150. Therefore, it is difficult for the light (light L3) incident on upper end portion 141 of first optical element 140 to deviate from second optical element 150. These features can inhibit occurrence of stray light caused by the light (L3) incident on upper end portion 141 of first optical element 140.

D>|fv| is satisfied, where D is a distance from a center of display element 130 to a center of first optical element 140, and fv is a focal length of first optical element 140.

With this, distance D and focal length fv of first optical element 140 satisfy the above relationship. Therefore, the display light rays converged by first optical element 140 can intersect reliably. In particular, in the present embodiment, distance E from the center of first optical element 140 to the center of second optical element 150 and focal length fv of first optical element 140 satisfies E>|fv|. Therefore, the display light rays converged by first optical element 140 can intersect more reliably.

Among the display light emitted from first end portion 131 of display element 130, light (light L1) incident on lower end portion 142 of first optical element 140 travels with an upward vector to second optical element 150.

With this, since the light (light L1) incident on lower end portion 142 of first optical element 140 travels with an upward vector to second optical element 150, the space consumed by the display light can be reduced. Display element 130 can be disposed in this reduced space, thereby reducing the height of head-up display device 100.

Since the rear end portion of cover 120 is located below the front end portion of cover 120, the height of head-up display device 100 can be reduced at its rear.

Since first optical element 140 is a concave mirror, the height of head-up display device 100 can be reduced, even when head-up display device 100 includes a concave mirror as first optical element 140.

Moreover, in the present embodiment, display element 130 is in an orientation that causes the main light ray traveling from display element 130 to first optical element 140 to be inclined with respect to the normal direction of display element 130. Because of this orientation, even when sunlight enters through cover 120, it is difficult for the sunlight to return into the optical system. In other words, this can inhibit stray light caused by sunlight.

5. Others

The head-up display device according to the present disclosure has been described above on the basis of the embodiment, but the present disclosure is not limited to this embodiment. One or more aspects of the present disclosure may include variations achieved by making various modifications to this embodiment that can be conceived by those skilled in the art or one or more embodiments achieved by combining structural elements in different embodiments without departing from the essence of the present disclosure. In subsequent description, parts substantially the same as the parts in the above embodiment may be assigned with like reference sings and the description thereof may be omitted.

Figure 6:
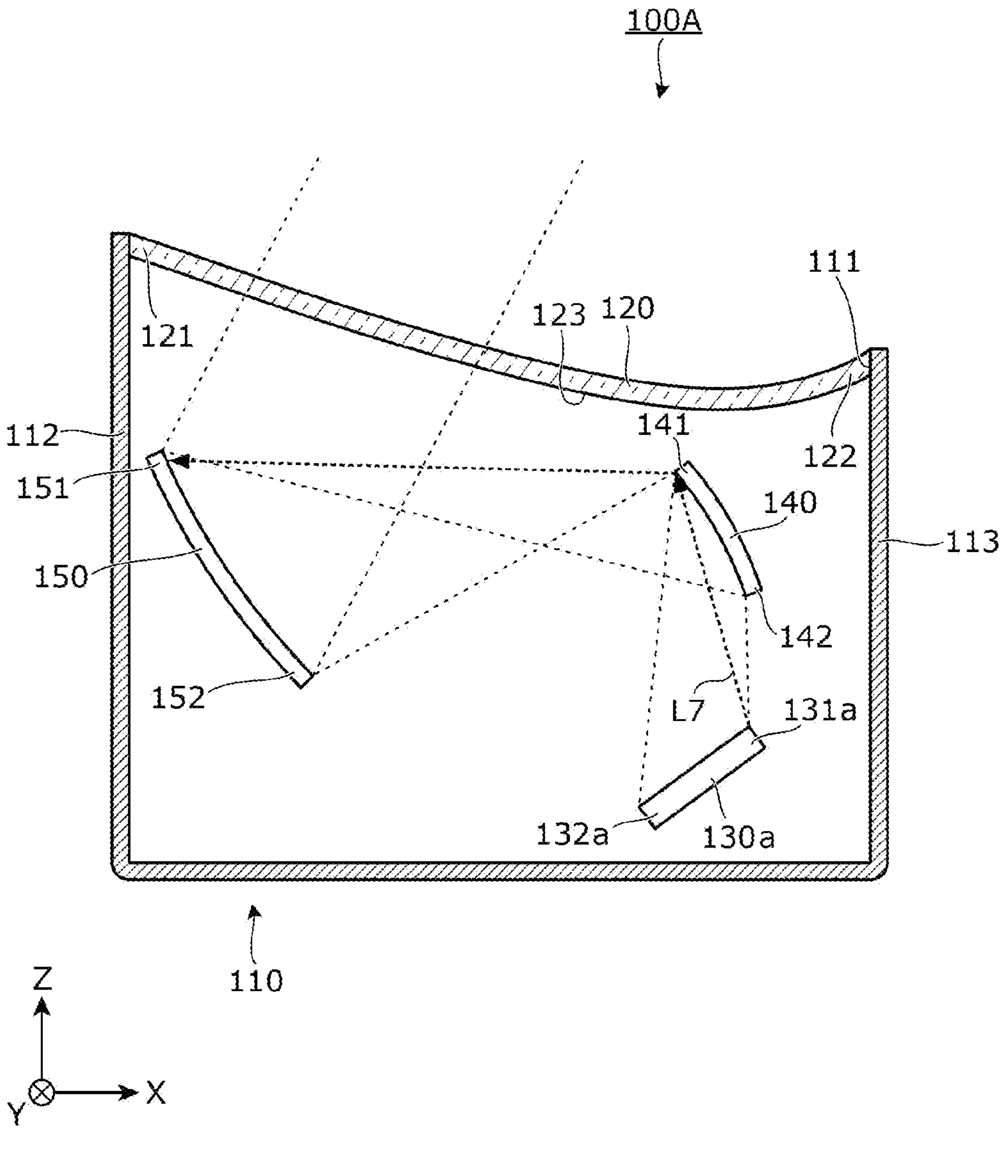
FIG. 6 is a schematic cross-sectional view of a head-up display device according to Variation 1.

FIG. 6 is a schematic cross-sectional view of head-up display device 100A according to Variation 1. FIG. 6 corresponds to FIG. 4. As illustrated in FIG. 6, the inclination direction of display element 130*a* of head-up display device 100A according to Variation 1 is opposite to the inclination direction of display element 130 of head-up display device 100 according to the above embodiment. More specifically, first end portion 131*a* of display element 130*a* is located above second end portion 132*a*. Even in this case, the distance from first end portion 131*a* to display element 130 is closer than the distance from second end portion 132*a* to display element 130. In other words, light L7, which is part of light emitted from first end portion 131*a* of display element 130*a*, travels to upper end portion 141 of first optical element 140, and is incident on and reflected off upper end portion 141. In other words, light L7 is light incident on upper end portion 141 of first optical element 140. Light L7 then travels toward a point below the upper edge of second optical element 150 due to the convergence effect of first optical element 140. As a result, light L7 avoids cover 120 and travels to second optical element 150, and therefore stray light can be inhibited.

Figure 7:
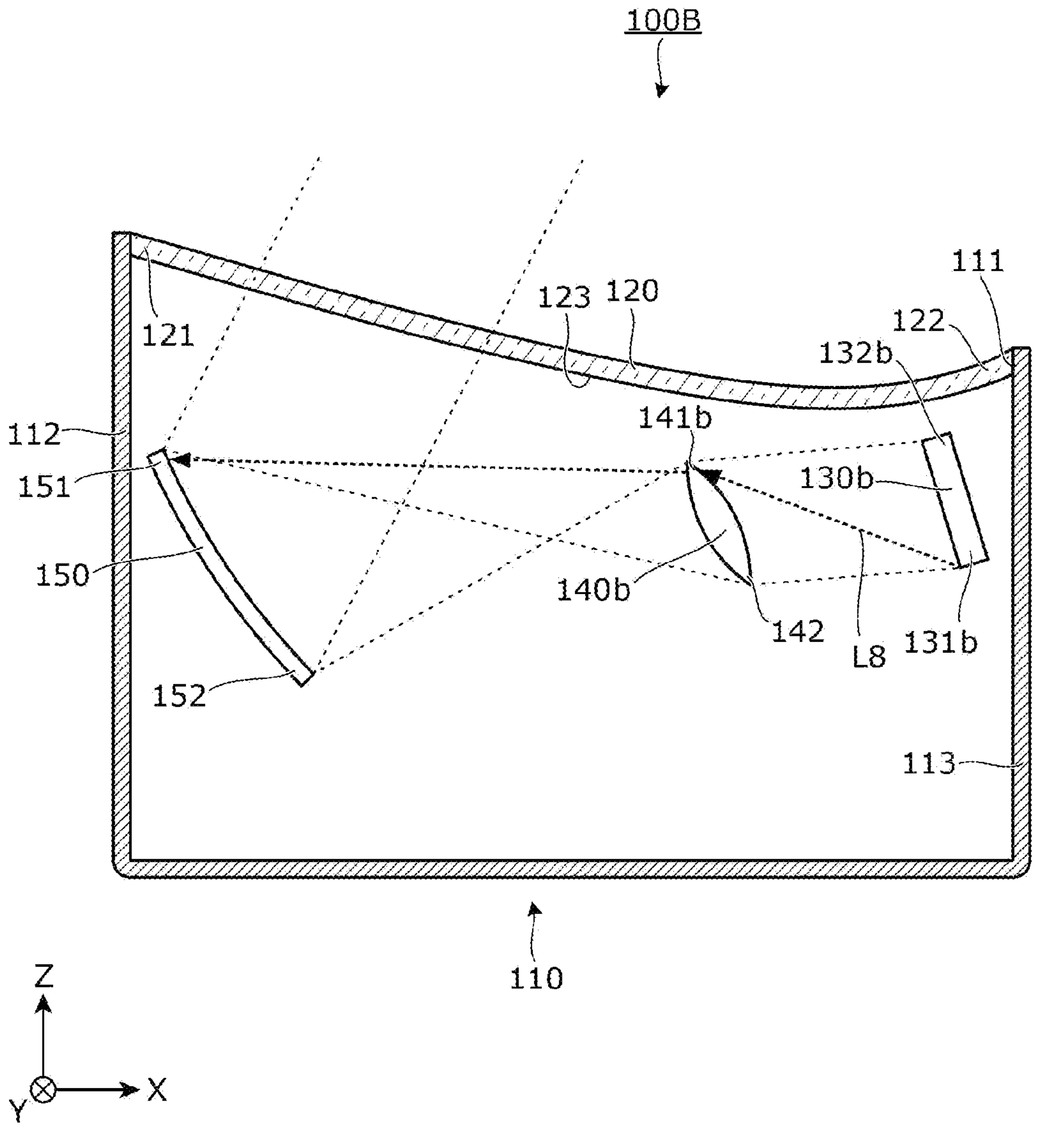
FIG. 7 is a schematic cross-sectional view of a head-up display device according to Variation 2.

FIG. 7 is a schematic cross-sectional view of head-up display device 100B according to Variation 2. FIG. 7 corresponds to FIG. 4. As illustrated in FIG. 7, head-up display device 100B according to Variation 2 includes a convex lens as first optical element 140*b*.

More specifically, display element 130*b*, first optical element 140*b*, and second optical element 150 are arranged from the rear to the front in stated order in housing 110. Display element 130*b* is disposed in an orientation such that first end portion 131*b* is positioned behind and below second end portion 132*b*. The display surface of display element 130*b* that emits the display light is located opposite to first optical element 140*b*. First optical element 140*b*, which is a convex lens, is disposed with upper end portion 141*b* positioned ahead of and above lower end portion 142*b*. Since first optical element 140*b* is a convex lens, the display light emitted by display element 130*b* can be converged.

Also in this case, light L8, which is part of light emitted from first end portion 131*b* of display element 130*b*, travels to upper end portion 141*b* of first optical element 140*b*, and passes through upper end portion 141*b*. In other words, light L8 is light passing through upper end portion 141*b* of first optical element 140*b*. Light L8 then travels toward a point below the upper edge of second optical element 150 due to the convergence effect of first optical element 140*b*. As a result, light L8 avoids cover 120 and travels to second optical element 150, and therefore stray light can be inhibited.

As described above, even with head-up display device 100B including a concave mirror as first optical element 140*b*, stray light can be inhibited while reducing the height of head-up display device 100B. In this case, since display element 130*b*, first optical element 140*b*, and second optical element 150 are disposed side-by-side in the X-axis direction, the space consumption in the Z-axis direction can be reduced. Therefore, it is possible to further reduce the height of the head-up display.

Figure 8:
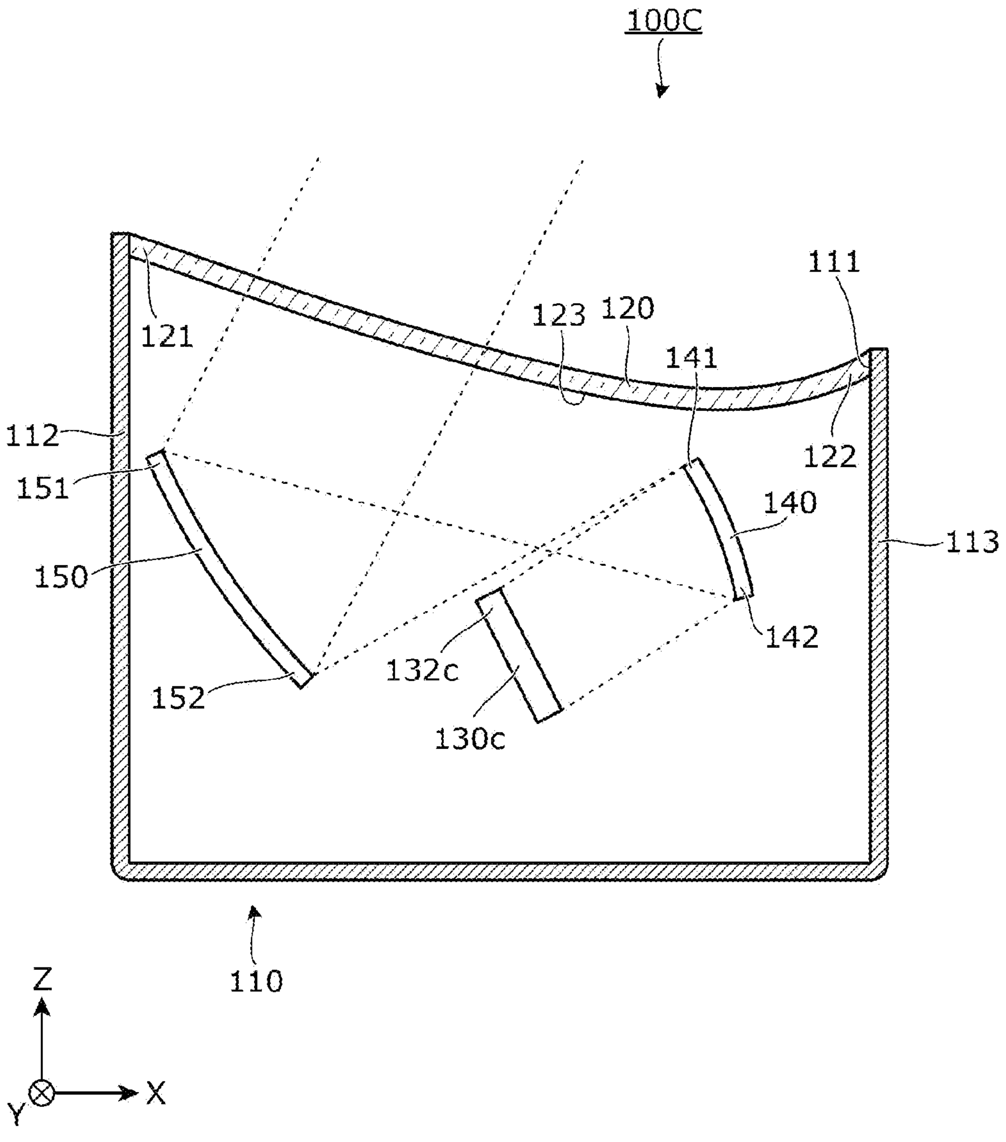
FIG. 8 is a schematic cross-sectional view of a head-up display device according to Variation 3.

FIG. 8 is a schematic cross-sectional view of head-up display device 100C according to Variation 3. FIG. 8 corresponds to FIG. 4. As illustrated in FIG. 8, in head-up display device 100C according to Variation 3, display element 130*c* is disposed with second end portion 132*c* of display element 130*c* positioned above the lower edge of second optical element 150. In this case, display element 130*c* is disposed away from the optical path of the display light. Accordingly, second end portion 132*c* of display element 130*c* and the lower edge of second optical element 150 overlap each other, thereby reducing the height of head-up display device 100C.

Supplementary Note

The above-described embodiment and the like disclose the following techniques.

(Technique 1)

A head-up display device including:

a housing including an opening at a top;

a cover that is light-transmissive and closes the opening;

a display element housed in the housing;

a first optical element disposed on an optical path of display light emitted from the display element; and a second optical element that is disposed ahead of the first optical element on a portion of the optical path of the display light after the first optical element, and reflects the display light toward the opening, in which the cover has a downward convex shape and includes a curved surface portion that descends in a direction from a front end portion of the cover toward a rear end portion of the cover, the first optical element has an effect of converging the display light, and among display light emitted from one end portion, among end portions of the display element, that is closer in distance to the first optical element, light incident on an upper end portion of the first optical element travels toward a point below an upper edge of the second optical element.

(Technique 2)

The head-up display device according to technique 1, in which $D>|fv|$ is satisfied, where D is a distance from a center of the display element to a center of the first optical element, and fv is a focal length of the first optical element.

(Technique 3)

The head-up display device according to technique 1 or 2, in which among the display light emitted from the one end portion of the display element, light incident on a lower end portion of the first optical element travels with an upward vector to the second optical element.

(Technique 4)

The head-up display device according to any one of techniques 1 to 3, in which the rear end portion of the cover is located below the front end portion of the cover.

(Technique 5)

The head-up display device according to any one of techniques 1 to 4, in which the first optical element is a concave mirror.

(Technique 6)

The head-up display device according to any one of techniques 1 to 4, in which the first optical element is a convex lens.

(Technique 7)

The head-up display device according to any one of techniques 1 to 6, in which at least part of the display element is located above a lower edge of the second optical element.

While an embodiment has been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims are incorporated herein by reference in their entirety: Japanese Patent Application No. 2023-038883 filed on Mar. 13, 2023.

INDUSTRIAL APPLICABILITY

The present disclosure is useful as a head-up display device provided in a vehicle.

What is claimed is:

1. A head-up display device configured to be provided in a vehicle comprising:

a housing including an opening at a top;

a cover that is light-transmissive and closes the opening;

a display element housed in the housing;

a first optical element disposed on an optical path of display light emitted from the display element; and a second optical element that is disposed ahead of the first optical element on a portion of the optical path of the display light after the first optical element, and reflects the display light toward the opening, wherein the display element, the first optical element, and the second optical element are arranged on the optical path in this order from a light-emitting side toward the opening, a direction in which the vehicle travels is defined as a first direction, a direction in which the vehicle moves forward is defined as a forward side of the first direction, the cover has a downward convex shape and includes a curved surface portion that descends in a direction from a first front end portion of the cover toward a first rear end portion of the cover, the first front end portion being an end portion of the cover located on the forward side of the first direction and the first rear end portion being an end portion of the cover located on an opposite side of the first direction, and the first rear end portion of the cover being located below the first front end portion of the cover, the first optical element has an effect of converging the display light, and among display light emitted from one end portion, among end portions of the display element, that is closer in distance to the first optical element, light incident on an upper end portion of the first optical element travels toward a point below an upper edge of the second optical element.

2. The head-up display device according to claim 1, wherein $D>|fv|$ is satisfied, where D is a distance from a center of the display element to a center of the first optical element, and fv is a focal length of the first optical element.

3. The head-up display device according to claim 1, wherein among the display light emitted from the one end portion of the display element, light incident on a lower end portion of the first optical element travels with an upward vector to the second optical element.

4. The head-up display device according to claim 1, wherein the first optical element is a concave mirror.

5. The head-up display device according to claim 1, wherein the first optical element is a convex lens.

6. The head-up display device according to claim 1, wherein at least part of the display element is located above a lower edge of the second optical element.

* * * * *